United States Patent
Mondal et al.

(10) Patent No.: US 9,363,468 B2
(45) Date of Patent: Jun. 7, 2016

(54) VEHICLE VIDEO DISPLAY SYSTEM

(71) Applicant: AMERICAN MEGATRENDS, INC., Norcross, GA (US)

(72) Inventors: Umasankar Mondal, Snellville, GA (US); Jacob Narey, Lawrenceville, GA (US); Roger Smith, Suwanee, GA (US)

(73) Assignee: AMERICAN MEGATRENDS, INC., Norcross, GA (US)

(*) Notice: Subject to any disclaimer, the term of this patent is extended or adjusted under 35 U.S.C. 154(b) by 374 days.

(21) Appl. No.: 14/184,409

(22) Filed: Feb. 19, 2014

(65) Prior Publication Data

US 2014/0232870 A1    Aug. 21, 2014

Related U.S. Application Data

(60) Provisional application No. 61/766,466, filed on Feb. 19, 2013.

(51) Int. Cl.
    *H04N 7/01*      (2006.01)
    *H04N 7/18*      (2006.01)
    *G06F 3/14*      (2006.01)

(52) U.S. Cl.
CPC .. *H04N 7/01* (2013.01); *G06F 3/14* (2013.01); *H04N 7/183* (2013.01); *G09G 2330/026* (2013.01)

(58) Field of Classification Search
None
See application file for complete search history.

(56) References Cited

U.S. PATENT DOCUMENTS

| | | | | |
|---|---|---|---|---|
| 2002/0131768 | A1* | 9/2002 | Gammenthaler | G08B 13/19647 386/211 |
| 2006/0125919 | A1* | 6/2006 | Camilleri | B60R 1/00 348/148 |
| 2006/0227768 | A1* | 10/2006 | Sauber | G09G 5/006 370/360 |
| 2009/0046990 | A1* | 2/2009 | Takemura | B60R 1/00 386/222 |
| 2012/0044351 | A1* | 2/2012 | Kook | B60K 35/00 348/148 |

* cited by examiner

*Primary Examiner* — Maurice L McDowell, Jr.
(74) *Attorney, Agent, or Firm* — Locke Lord LLP; Tim Tingkang Xia, Esq.

(57) ABSTRACT

A vehicle display system and methods of controlling the same. In certain embodiments, an image processing module receives video signals from a video camera and generates first video data in a first format. A system management mode (SMM) program is stored in a memory. When executed at a processor, the SMM program reads the first video data from a first area of the memory, converts the first video data to second video data in a second format, and writes the second video data to a second area of the memory. A PCI express switch forwards the first video data in the first format to a memory controller for storing in the first area of the memory, and forwards the second video data in the second format from the second area of the memory to the graphic controller.

25 Claims, 4 Drawing Sheets

VEHICLE VIDEO DISPLAY SYSTEM

CROSS-REFERENCE TO RELATED PATENT APPLICATIONS

This application claims priority to and the benefit of, pursuant to 35 U.S.C. §119(e), U.S. provisional patent application Ser. No. 61/766,466, filed Feb. 19, 2013, entitled "VEHICLE VIDEO DISPLAY SYSTEM," by Umasankar Mondal, Jacob Narey, and Roger Smith, the disclosure of which is incorporated herein in its entirety by reference.

FIELD

The present disclosure relates to a vehicle video display system, and particularly to a BIOS or UEFI firmware component or application that control the vehicle video display system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In an In-Vehicle Infotainment (IVI) system with a vehicle back camera, it becomes necessary to display the captured video as soon as the vehicle engine and the IVI unit are turned on. Normal Basic Input/Output System (BIOS) boot and Linux Operating System (OS) or other OS boot can take typically 10-15 seconds or longer. Only after the booting process is completed, the camera display becomes available through a video display application running on the OS. The vehicle user, while backing up after the vehicle engine is on, will have to wait until the OS is booted to see video images captured by the back camera. This is an inconvenience in the current design of IVI.

Therefore, an unaddressed need exists in the art to address the aforementioned deficiencies and inadequacies.

SUMMARY

Certain aspects of the present disclosure direct to a vehicle display system. In certain embodiments, the vehicle display system includes: a video camera; a processor; a graphic controller; an image processing module; a memory; a memory controller controlling the memory; and a PCI express switch. The image processing module receives video signals from the video camera and generating first video data in a first format. The memory has a system management mode (SMM) program. When the SMM program is executed at the processor, the SMM program is configured to instruct the processor to read the first video data from a first area of the memory; convert the first video data to second video data in a second format; and write the second video data to a second area of the memory. The PCI express switch is configured to forward the first video data in the first format and received from the image processing module to the memory controller for storing in the first area of the memory; and forward the second video data in the second format and retrieved by the memory controller from the second area of the memory to the graphic controller.

In certain embodiments, the memory further has a Basic Input/Output System (BIOS) program configured to, when executed at the processor, initiate the graphic controller, the PCI express switch, the memory controller and the image processing module. In certain embodiments, the BIOS program is further configured to, when executed at the processor, initiate PCI express communication channels among the graphic controller, the PCI express switch, the memory controller and the image processing module, such that the graphic controller, the memory controller and the image processing module are capable of communicating with each other through the PCI express switch.

In certain embodiments, the BIOS program is further configured to execute a system management interrupt (SMI) handler in a system management RAM (SMRAM) area in the memory, wherein the SMI handler is configured to load the SMM program into the SMRAM area.

In certain embodiments, the BIOS program is further configured to load the SMM program into a system management RAM (SMRAM) area in the memory.

In certain embodiments, the graphic controller is configured to process the second video data in the second format to generate video output signals based on the second video data.

In certain embodiments, the vehicle display system further includes a display device configured to display the video output signals; and a display driver configured to receive instructions from the graphic controller to generate the video output signals based on the second video data, and to send the video output signals to the display device.

In certain embodiments, the SMM program is further configured to determine whether the display device is activated or deactivated.

In certain embodiments, the vehicle display system further includes a camera image display activation/deactivation mechanism, configured to: in response to the display device being activated, enable access of the graphic controller to the second area of the memory; and in response to the display device being deactivated, disable the access of the graphic controller to the second area of the memory.

In certain embodiments, the first format is a YUV 4:2:2 format, and the second format is a BGRA or RGB 8:8:8 format.

Certain aspects of the present disclosure direct to a method of controlling a vehicle display system. In certain embodiments, the method includes: receiving, at an image processing module, video signals captured by a video camera, and generating first video data in a first format based on the video signals; forwarding, by a PCI express switch, the first video data received at the image processing module to a memory controller, and storing the first video data in a first area of a memory; executing, at a processor, a system management mode (SMM) program; reading, at the processor executing the SMM program, the first video data from the first area of the memory; converting, at the processor executing the SMM program, the first video data to second video data in a second format; writing, at the processor executing the SMM program, the second video data in a second area of the memory; retrieving, by the memory controller, the second video data in the second format from the second area of the memory; and forwarding, by the PCI express switch, the second video data retrieved by the memory controller to a graphic controller.

In certain embodiments, the method further includes: initiating, by a Basic Input/Output System (BIOS) program executed at the processor, the graphic controller, the PCI express switch, the memory controller and the image processing module; and initiating, by the BIOS program executed at the processor, PCI express communication channels among the graphic controller, the PCI express switch, the memory controller and the image processing module, such that the graphic controller, the memory controller and the image processing module are capable of communicating with each other through the PCI express switch.

In certain embodiments, the BIOS program is configured to execute a system management interrupt (SMI) handler in a system management RAM (SMRAM) area in the memory, wherein the SMI handler is configured to load the SMM program into the SMRAM area.

In certain embodiments, the BIOS program is configured to load the SMM program into a system management RAM (SMRAM) area in the memory.

In certain embodiments, the method further includes: instructing, by the graphic controller, a display driver to process the second video data in the second format to generate video output signals based on the second video data; and displaying, at a display device, the video output signals.

In certain embodiments, the method further includes: determining, by the SMM program, whether the display device is activated or deactivated; in response to the display device being activated, enabling, by a camera image display activation/deactivation mechanism, access of the graphic controller to the second area of the memory; and in response to the display device being deactivated, disabling, by the camera image display activation/deactivation mechanism, the access of the graphic controller to the second area of the memory.

In certain embodiments, the first format is a YUV 4:2:2 format, and the second format is a BGRA or RGB 8:8:8 format.

Certain aspects of the present disclosure direct to a non-transitory computer readable medium storing computer executable codes. The codes, when executed at a processor of a vehicle display system, are configured to: instruct an image processing module to receive video signals captured by a video camera, and to generate first video data in a first format based on the video signals; instruct a PCI express switch to forward the first video data received at the image processing module to a memory controller, and store the first video data in a first area of a memory; execute a system management mode (SMM) program; read, at the processor executing the SMM program, the first video data from the first area of the memory; convert, at the processor executing the SMM program, the first video data to second video data in a second format; write, at the processor executing the SMM program, the second video data in a second area of the memory; instruct the memory controller to retrieve the second video data in the second format from the second area of the memory; and instruct the PCI express switch to forward the second video data retrieved by the memory controller to a graphic controller.

In certain embodiments, the codes are further configured to: execute a Basic Input/Output System (BIOS) program at the processor; and initiate, by the BIOS program executed at the processor, the graphic controller, the PCI express switch, the memory controller and the image processing module.

In certain embodiments, the codes are further configured to: initiate, by the BIOS program executed at the processor, PCI express communication channels among the graphic controller, the PCI express switch, the memory controller and the image processing module, such that the graphic controller, the memory controller and the image processing module are capable of communicating with each other through the PCI express switch.

In certain embodiments, the codes are further configured to: execute, by the BIOS program executed at the processor, a system management interrupt (SMI) handler in a system management RAM (SMRAM) area in the memory; and load, by the SMI handler, the SMM program into the SMRAM area.

In certain embodiments, the codes are further configured to load, by the BIOS program executed at the processor, the SMM program into a system management RAM (SMRAM) area in the memory.

In certain embodiments, the codes are further configured to: control the graphic controller to instruct a display driver to process the second video data in the second format to generate video output signals based on the second video data; and display, at a display device, the video output signals.

In certain embodiments, the codes are further configured to instruct the SMM program to determine whether the display device is activated or deactivated; in response to the display device being activated, enable, by a camera image display activation/deactivation mechanism, access of the graphic controller to the second area of the memory; and in response to the display device being deactivated, disable, by the camera image display activation/deactivation mechanism, the access of the graphic controller to the second area of the memory.

In certain embodiments, the first format is a YUV 4:2:2 format, and the second format is a BGRA or RGB 8:8:8 format.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
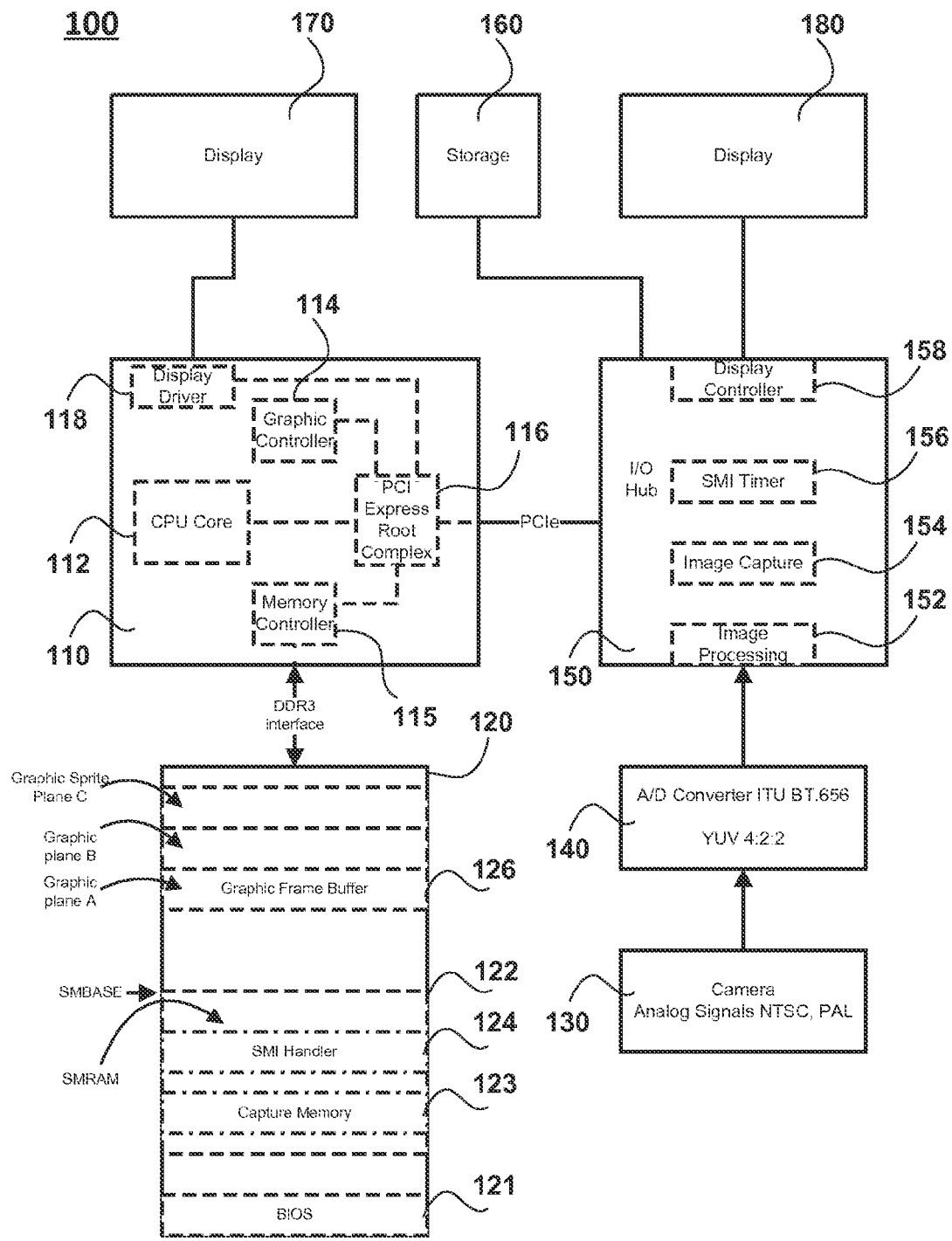
FIG. 1 schematically depicts a video display system in accordance with certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors of various architectures. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

The present disclosure is directed to a video display system, which is particularly useful on a vehicle. The video display system includes a central processing unit (CPU), a memory, a graphic controller, a memory controller, a PCI express (PCIe) root complex, and an I/O hub (IOH), a display driver, a display, and analog-to-digital video-signal converter (A/D converter), and a camera. In certain embodiments, the graphic controller, the memory controller, and the PCI express root complex can be packaged in the same chip of the CPU. INTEL ATOM processor is an example of such a processor.

FIG. 1 schematically shows a video display system in accordance with certain embodiments of the present disclosure. As shown in FIG. 1, the video display system 110 includes a processor chip 110, a memory 120, a camera 130, an A/D converter 140, an I/O hub 150, and a storage 160. In this example, the processor chip 110 has a CPU core 112, a graphic controller 114, a memory controller 115, a PCIe root complex 116, and a display driver 118. The I/O hub 150 has an image processing module 152, an image capture module 154, a SMI timer 156, and a display controller 158.

The camera 130 can generate analog video signals in any suitable format, which for example can be NTSC, PAL, or SECAM. The camera 130 generates video signals at a predetermined frame rate. For example, in accordance with NTSC, the interlaced video signals are generated at a rate of 29.97 frames per second or 59.94 fields per second. When the video display system 100 is installed on a vehicle, the camera 130 can be installed at the backside of the vehicle and capture images or videos of the space behind the vehicle. The camera 130 is in communication with the A/D converter 140 and transmits the analog video signals to the A/D converter 140. For example, the A/D converter 140 can be ADV7180 manufactured by ANALOG DEVICE. The A/D converter 140 can convert the analog signals to any desired digital format such as the 8-bit ITU-R BT.656 interface standard. ITU-R BT.656 builds upon the 4:2:2 digital video encoding parameters defined in ITU-R Recommendation BT.601, which provides interlaced video data, streaming each field separately, and uses the YCbCr (YUV) color space and a 13.5 MHz sampling frequency for pixels. The A/D converter 140 is in communication with the I/O hub (IOH) 150. The A/D converter 140 typically generates interlaced video signals. The A/D converter 140 can be connected with the I/O hub 150 through, for example, a coaxial cable.

The I/O hub 150 has an image processing module 152 that can process the received interlaced video signal from the A/D converter 140. For example, the I/O hub 150 can be ST-MICRO STA2X11 manufactured by ST MICROELECTRONICS. The image processing module 152 can decode and de-interlace the received image fields. In other words, the imaging processing module 152 utilizes preconfigured operations or techniques to combine a top image field and a bottom image field received from the A/D converter 140 to generate an image frame. The image frame is represented by pixel values in the format of the camera 130 and for example in YUV color space. In this example, the YUV image data also has a 4:2:2 sub-sampling rate. That is, the two chroma components are sampled at half the sample rate of luma; the horizontal chroma resolution is halved. In certain embodiments, each of the luma and chrominance components has a value represented by a byte (8-bit). Thus, for the YUV 4:2:2 data, every four bytes represent two pixels. The image processing module 152 accordingly generates video data for each image frame, which can be used for progressive scan display.

Typically, if necessary, the video display system 100 uses a video display application running on an operating system (e.g. Linux) to further process and convert the video frame data in the format of the camera 130 (e.g. YUV 4:2:2) to video frame data in a format (e.g., BGRA or RGB 8:8:8) that is supported by the graphic controller 114 of the video display system 100. The video display application can instruct the graphic controller 114 and the display driver 118 to generate video signals and output the video signals to the display device 170 for displaying the captured video images. Typically, the BIOS and the operating system can take 10-15 seconds to boot up. Only after the bootup process completes, the video display application can be initiated on the OS and run to display the video images captured by the camera 130. In other words, no images from the camera 130 can be displayed on the display device 170 during the booting process, if the video display system 100 only uses the video display application running on the operating system.

In certain embodiments, the video display system 100 can utilize a BIOS (or UEFI firmware component or application or other non-OS) program 121 or some BIOS techniques to display on the display device the video frames captured from the camera 130 until the operating system is booted and able to run the video display application. As will be described in detail below, the BIOS program 121 can be configured to boot the operating system in a non-graphic mode. The BIOS program 121 can further set up the video display system 100 to display the video images on the display device without using the operating system before the operating system is boot-up.

In certain embodiments, the graphic controller 114 does not support the video format of the camera 130. For example, the graphic controller 114 may not support video frame data in the format (e.g. YUV 4:2:2) received from the camera and the IOH 150, but only supports video data in some other video formats (e.g. RGB 8:8:8). In these circumstances, the video display system 100 can utilize a system management mode (SMM) program to convert the video frame data from the camera 130 to a format that is supported by the graphic controller 114.

In certain embodiments, the CPU core 112, the graphic controller 114, and the memory controller 115, and the IOH 150 each is in communication with the PCI express root complex 116, which is a PCI express switch. In addition to the protected mode (i.e. the native operating mode of the processor 110), the CPU core 112 can operate in a system management mode (SMM). SMM is entered through activation of an external system interrupt pin (SMI#), which generates a system management interrupt (SMI). In SMM, the processor switches to a separate address space while saving the context of the currently running program or task. SMM-specific code may then be executed transparently. Upon returning from SMM, the processor is placed back into its state prior to the SMI.

In certain embodiments, after the video display system 100 is powered on, the CPU 112 initially loads the BIOS program 121 from a storage device (e.g., BOOT ROM/FLASH memory) of the video display system 100. The BIOS program 121 sets up and initiates the PCI express communication channels among the graphic controller 114, the PCI express root complex 116, the memory controller 115, and the I/O hub 150. In other words, the graphic controller 114, the memory controller 115, and the I/O hub 150 are configured as PCI express devices such that those devices are able to communicate with each other through the PCI express root complex 116 in accordance with protocols defined in the PCI express specification. PCI express format specifications are maintained and developed by the PCI Special Interest Group (PCI-SIG). Further, the communication among those devices through the PCI express channels may not involve or depend on the CPU 112. In certain embodiments, the memory 120 can be a DDR3 memory.

As mentioned above, in SMM, the processor 110 switches to a separate address space while saving the context of the currently running program or task. SMM is a special purpose operating mode provided for handling system-wide functions like power management, system hardware control, or proprietary OEM-designed code. It is intended for use only by system firmware, not by applications software or general-purpose systems software. The main benefit of SMM is that it offers a distinct and easily isolated processor environment that operates transparently to the operating system or executive and software applications.

When SMM is invoked through a system management interrupt (SMI), the processor saves the current state of the processor (the context of the processor), then switches to a separate operating environment contained in system management RAM (SMRAM). While in SMM, the processor executes SMI handler code to perform operations such as powering down unused disk drives or monitors, executing proprietary code, or placing the whole system in a suspended state. When the SMI handler has completed its operations, it executes a resume (RSM) instruction. This instruction causes the processor to reload the saved context of the processor, switch back to protected or real mode, and resume executing the interrupted application or operating system program or task.

In certain embodiments, while in SMM, the processor executes code and stores data in the SMRAM space (hereinafter the SMRAM) 122. The SMRAM 122 is mapped to the physical address space of the processor and for example can be within the Processor Address Space up to 4 GBytes in size. The processor uses this space to save the context of the processor and to store the SMI handler code, data and stack. It can also be used to store system management information (such as the system configuration and specific information about powered-down devices) and OEM-specific information.

As an example, the default size of the SMRAM 122 can be 64 KBytes beginning at a base physical address in the physical memory 120 called the SMBASE. The SMBASE default value following a hardware reset can be for example 30000H. The processor looks for the first instruction of the SMI handler 124 at the address [e.g., SMBASE+8000H]. It stores the processor's state in the area from for example [SMBASE+ FE00H] to [SMBASE+FFFFH]. The system logic is minimally required to decode the physical address range for the SMRAM 122 from [SMBASE+8000H] to [SMBASE+ FFFFH]. A larger area can be decoded if needed. The size of this SMRAM 122 can be between 32 KBytes and 4 GBytes. The location of the SMRAM 122 can be changed by changing the SMBASE value. The actual physical location of the SMRAM 122 can be in system memory or in a separate RAM memory.

As an example, the default base address for the SMRAM 122 can be 30000H. This value can be contained in an internal processor register called the SMBASE register. The operating system or executive can relocate the SMRAM 122 by setting the SMBASE field in the saved state map (e.g., at offset 7EF8H) to a new value. The RSM instruction reloads the internal SMBASE register with the value in the SMBASE field each time it exits SMM. All subsequent SMI requests will use the new SMBASE value to find the starting address for the SMI handler 124 (e.g., at SMBASE+8000H) and the SMRAM state save area (e.g., from SMBASE+FE00H to SMBASE+FFFFH).

In certain embodiments, the BIOS program 121 can set up the SMBASE value in the SMBASE register. Further, the BIOS program 121 can load the SMM program in the memory area designated for the SMI handler 124. Alternatively, the BIOS program 121 can load an SMM loader program into the SMI handler 124 memory area. When executed by the CPU core 112, the SMM loader program can load the SMM program into the SMRAM 122 and then transfer control of the CPU core 112 to the SMM program.

Further, the BIOS program 121 can configure a capture memory 123 in the SMRAM 122 for storing video frame data received from the image processing module 152. The size of the capture memory 123 is configured to be sufficient to store video data for a single frame. For example, video data for a frame having 720×480 pixels and in YUV 4:2:2 format roughly have 700 KBytes. Accordingly, the size of the capture memory 123 is set to be about 700 KBytes to 1 Mbytes.

In addition, in certain embodiments, the I/O hub 150 have can include an SMI timer 156 that can be configured to issue an SMI to the CPU 112 at a predetermined time interval. The BIOS program 121 can also configure the SMI timer 156. For example, the BIOS program can set up the SMI timer 156 to issue an SMI about every 32 ms.

The BIOS program 121 also detects the location of the operating system loader program in one or more storage devices of the video display system 100. Upon detecting the OS loader program, the BIOS program 121 loads the OS loader program from a storage device and then transfer control of the CPU 112 to the OS loader program. Subsequently, the OS loader program starts loading the OS from the storage device into the memory 120 and transfer control of the CPU 112 to the OS.

As mentioned above, the BIOS program 121 has set up the I/O hub 150 and the memory controllers 115 as PCI express devices. The I/O hub 150 transmits the video frame data generated by the image processing module 152 to the memory controller 115 and instructs the memory controller 115 to write the video frame data in the capture memory 123. To accomplish this, the BIOS program 121 configures the I/O hub 150 with a PCI express address indicating the capture memory 123. The I/O hub 150 utilizes a PCI express device driver to encapsulate the video frame data in PCI express packets addressed to that PCI express address. The I/O hub 150 then transmits the PCI express packets to the PCI express root complex, which in turn forwards the PCI express packets to the memory controller 115 in accordance to the PCI express address specified in the PCI express packets. The memory controller 115, after receiving the PCI express packets, write the payload data contained in the PCI express packets to the capture memory 123 as indicated by the PCI express address of the packets.

In an example, the image processing module 152 receives a top image field and a bottom image field transmitted in accordance with NTSC at 29.97 frames or 59.94 fields per second. After the image processing module 152 de-interlaces a pair of top and bottom image fields and generates data for an image frame, the image processing module 152 instructs the I/O hub 150 to write the generated video frame data through a PCI express channel (established by the PCI express root complex) to the PCI express address specified by the BIOS program 121. In other words, in this example, roughly about every 32 ms the memory controller 115 receives video data of an image frame from the I/O hub 150 and writes the video data to the capture memory 123.

After the I/O hub 150 has completed transferring the image frame data to the capture memory 123 through the established PCI express channel, the SMM program can process the image data frame data in the capture memory 121. Various mechanisms can be utilized to issue an SMI to the CPU core 112 such that the CPU accordingly enters SMM. For example, an SMI timer 156 can be configured to issue an SMI to the CPU at a pre-configured time interval and for example every 32 ms. The SMI timer 156 can be located at any suitable locations and for example at the I/O hub or the PCI express root complex.

In response to the SMI, the CPU core 112 saves the processor's context relating to loading the operating system in the SMRAM 122, enters SMM, and begins to execute the SMI handler 124. As stated above, the format of the video frame data (e.g. YUV 4:2:2) may not be supported by the graphic controller 114. Therefore, the SMI handler 124 invokes the SMM program to convert the video frame data in the format of the camera 130 (e.g. YUV 4:2:2) stored in the capture memory 123 (which are received from the I/O hub 150) into video frame data in a format (e.g. RGB 8:8:8) supported by the graphic controller 114.

The SMM program can use the floating-point calculation to convert the video frame data in the format of the camera 130 to the video frame data in the format of the graphic controller 114. For example, if the format of the camera 130 is YUV 4:2:2 and the format of the graphic controller 114 is RGB 8:8:8, the pixel values represented in YUV color space can be converted to pixel values represented in RGB color space using the below equation.

$$\begin{bmatrix} R \\ G \\ B \end{bmatrix} = \begin{bmatrix} 1.164 & 0 & 1.596 \\ 1.164 & -0.391 & -0.813 \\ 1.164 & 2.018 & 0 \end{bmatrix} \left( \begin{bmatrix} Y \\ U \\ V \end{bmatrix} - \begin{bmatrix} 16 \\ 128 \\ 128 \end{bmatrix} \right) \quad (1)$$

In certain embodiments, the CPU core 112 supports single-instruction, multi-data (SIMD) instructions. The SMM program accordingly uses the SIMD instructions to convert the video frame data from one format to another. For example, when INTEL ATOM processor is used in the video display system, the SMM program uses MMX instructions. Typically for a processor supporting SIMD instructions, the processor has multiple SIMD registers that each can be divided into blocks having a predetermined number of bytes (or bits) on which computation can be simultaneously operated. For example, a SIMD register can be a 64-bit register; and computations with this register can operate simultaneously on two four-byte values, four two-byte values, or eight single bytes. Accordingly, the SMM program can use SIMD instructions to instruct the CPU core 112 to load values of 4 pixels in YUV 4:2:2 format stored in the capture memory, i.e. 64 bits, into a single SIMD register. Then, computations can operate simultaneously on 8 single byte blocks to generate values of the 4 pixels in RGB 8:8:8 format, i.e. 128 bits, which are temporarily stored in one or more SIMD registers. Subsequently, the SMM program instructs the CPU 112 to write the pixel values in RGB format to a memory area that is designated to and accessible by the graphic controller 114 (i.e., a graphic frame buffer 126).

As described above, the SMM program instructs the CPU core 112 to convert the frame data stored in the capture memory 123 to frame data in a format supported by the graphic controller 114. Subsequently, the CPU core 112 writes the converted pixel values to the graphic frame buffer 126. The graphic memory buffer 126 may have multiple planes such as Planes A, B, and C. In this example, the SMM program instructs the CPU to write the converted pixel values into one of the planes such as Plane A.

For INTEL ATOM graphics, the graphic frame buffer 126 can be easily accessible, and data can be directly written into the graphic frame buffer 126 using 32-bit BGRA (BLUE, GREEN, RED, ALPHA) format. The YUV to RGB conversion will be done using INTEL MMX instruction and the code can be written in C++ with in-line MMX assembly instruction, so that the conversion is quicker and time efficient.

As mentioned above, the BIOS program 121 has set up the PCI express channels among the graphic controller 114, that PCI express root complex 116, and the memory controller 115. Further, the graphic controller 114 is configured to read data, through PCI express channels, from the graphic frame buffer 126. Thus, the graphic controller 114 can retrieve the converted image data from the graphic frame buffer 126, process the converted image data, and further utilize a display driver to generate video output signals based on the converted image data. The display driver can be located at various suitable places. For example, the display driver 118 can be packaged in the same chip of the CPU core 112. In addition, a display controller 158 can be located at the I/O hub 150 as an alternate display driver. The graphic controller 114 can be in direct communication with the display driver 118 packaged in the same chip. The graphic controller 114 can be in connection with the display controller 158 in the I/O hub through a SDVO, RGB, or any other suitable connection. In this manner, a display 170 connected with the output of the display driver 118 or a display 180 connected with the output of the display controller 158 can display the video images captured by the camera 130 in accordance with the video signals output by the display driver 118 or the display controller, respectively.

The SMM program also determines whether the operating system has been completely booted. After the operating system has been booted, it is not necessary for the SMM program to convert the captured video data and then write the converted data to the graphic frame buffer. At this time, the video display application can be initiated by the operating system and subsequently handles the video data conversion and video display functions.

Figure 2:
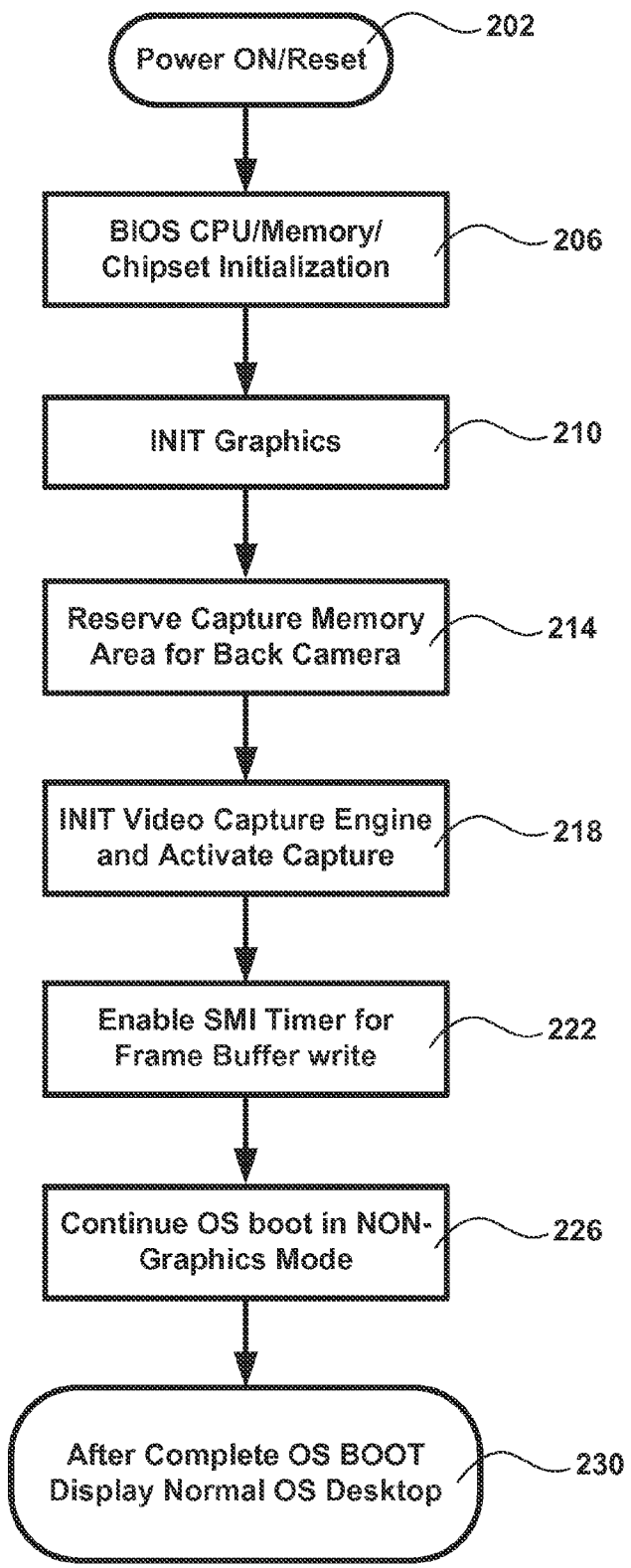
FIG. 2 schematically depicts a flowchart showing the booting process of the video display system utilizing a SMM program in accordance with certain embodiments of the present disclosure.

FIG. 2 is a flowchart showing the booting process of the video display system utilizing a SMM program in accordance with certain embodiments of the present disclosure. In this embodiment, the display device 170 will be used as the display device of the video display system 100 for displaying the video output signals.

At operation 202, the video display system 100 is powered on or reset. At operation 206, the BIOS program 121 initiates the basic hardware of the video display system 100, including for example the CPU core 112, the memory controller 115, the memory 120, the PCI express root complex 116, and the I/O hub 150. At operation 210, the BIOS program 121 initiates the graphic controller 114 and optionally can instruct the graphic controller 114 to output a predefined image, such as a company logo, for display on the display device 170. At operation 214, the BIOS program 121 configures the capture memory 123 to store the video frame data received from the I/O hub 150. At operation 218, the BIOS program 121 sets up the configuration for the SMM program. For example, the BIOS program 121 can set up the SMI handler 124 in the SMRAM 122 such that the SMI handler 124 can load the SMM program from a storage to the SMRAM 122. Alternatively, the BIOS program 121 can load the SMM program into the SMRAM 122. At operation 222, the BIOS program 121 enables the SMI timer 156 and then configures the SMI timer 156 to issue an SMI at a predetermined time interval. At operation 226, the BIOS program 121 locates an OS loader from a storage device, loads the OS loader into the memory 120, and then transfer control of the CPU 112 to the OS loader. At operation 230, the OS loader boots up the operating system, which in turn initiates the video display application. The video display application can display the captured video images.

Figure 3:
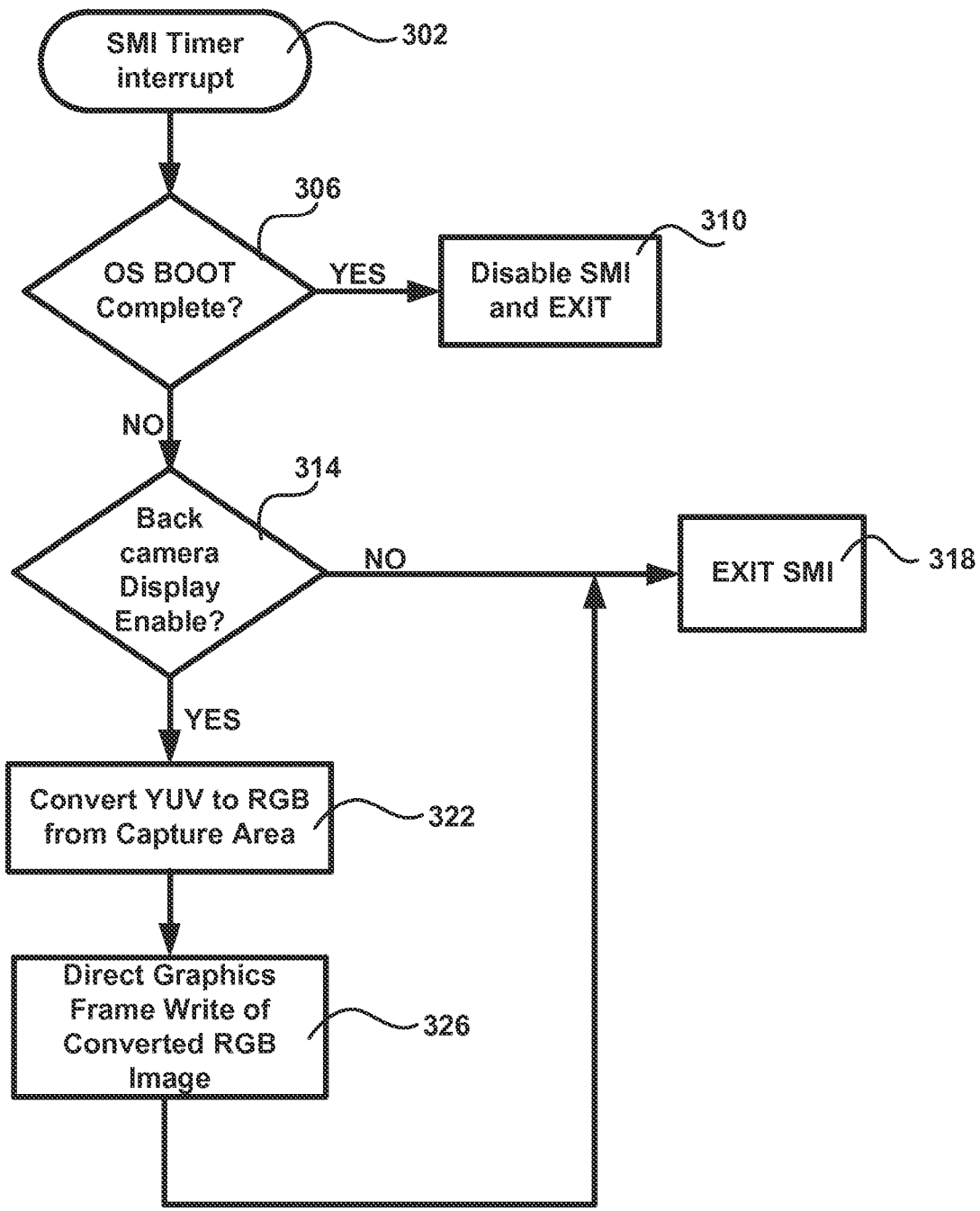
FIG. 3 schematically depicts a flowchart illustrating the process of the SMM program in accordance with certain embodiments of the present disclosure.

FIG. 3 is a flowchart illustrating the process of the SMM program in accordance with certain embodiments of the present disclosure. At operation 302, the SMI timer 156 issues an SMI to the CPU 112. Accordingly, the CPU 112 is switched to the SMM and ask executes the SMI handler 124 at a preconfigured location in the SMRAM 122. The SM handler 124 then executes the SMM program. At operation 306, the SMM program checks if the OS has been booted completely. If the OS has been booted completely, the SMM program enters operation 310. Otherwise, the SMM program enters operation 314. At operation 310, the SMM program disables the SMI timer 156 and then instructs the CPU 112 to exit the SMM. At operation 314, the SMM program determines whether the back camera display (i.e. the display device 170) is enabled. If it is not enabled, the SMM program enters operation 318. Otherwise, the SMM program enters operation 322. At operation 318, the SMM program instructs the CPU core 112 to exit the SMM. At operation 322, the SMM program processes the video frame data stored in the capture memory 123 in the format of the video camera 130, and converts the video frame data to a format supported by the graphic controller 114. At operation 326, the SMM program directs the CPU 112 to write the converted video frame data, which are in a format supported by the graphic controller 114, to the graphic frame buffer 126. Then the SMM program enters operation 318.

In certain embodiments, the graphic controller 114 may support the format of the video camera 130. For example, the graphic controller 114, the image processing module 152, and the camera 130 may all support frame data YUV 4:2:2 format. In this instance, it is not necessary to use the SMM program to convert the video frame data from one format to another. Accordingly, the BIOS program 121 does not set up the SMI timer 156 and does not configure the CPU core 112 for operating in the SMM. During the process of setting up the PCI express communication channels, the BIOS program 121 sets up the I/O hub 150 to write the video frame data generated by the image processing module 152, through the PCI express root complex 116, to a PCI express address indicating the graphic frame buffer 126. For example, the graphic frame buffer 126 is a SPRITE C graphic plane. Accordingly, the memory controller 115 receives the video frame data encapsulated in PCI express packets and writes the video from data to the graphic frame buffer 126. Further, the graphic controller 114 is configured to read data, through PCI express channels, from the graphic frame buffer 126.

Further, the I/O hub 150 writes the video frame data generated by the imaging processing module 152 periodically to the graphic frame buffer 126. For example, the data can be written roughly at about every 32 ms.

Further, the BIOS program 121 enables the graphic controller 114 to read data from the graphic frame buffer 126 (e.g. SPRITE Plane c). Thus, the graphic controller 114 can retrieve the converted image data from the graphic frame buffer 126, process the converted image data, and further utilizes a display driver 118 to generate video output signals based on the converted image data.

In certain embodiments, the video display system 100 can further include a camera image display activation/deactivation mechanism. This mechanism enables the access of the graphic controller 114 to the designated graphic frame buffer 126 (e.g. SPRITE Plane c) or disables the access of the graphic controller 114 to the designated graphic frame buffer 126. For example, where the video display system 100 is utilized in a vehicle and the camera 130 is installed at the back of the vehicle for displaying rear location images, the activation/deactivation mechanism can be coupled to the reverse gear of the vehicle. In other words, when the vehicle is being switched to the reverse gear, a trigger (e.g. a button) is pressed to activate the back camera display. When the vehicle is being switched to the drive gear, a trigger is pressed to de-activate the back camera display.

In certain embodiments, when the trigger is pressed, it can initiate an SMI. The SMI handler 124 may invoke an SMM routine that, based on the triggering event or status of the vehicle, enables access of the graphic controller 114 to the designated graphic frame buffer 126 (e.g. SPRITE Plane c) or disables access of the graphic controller 114 to the designated graphic frame buffer 126. For example, when the vehicle is in the reverse gear, the SMM routine activates the back camera display. When the vehicle is in the drive gear, the SMM routine de-activates the back camera display.

Figure 4:
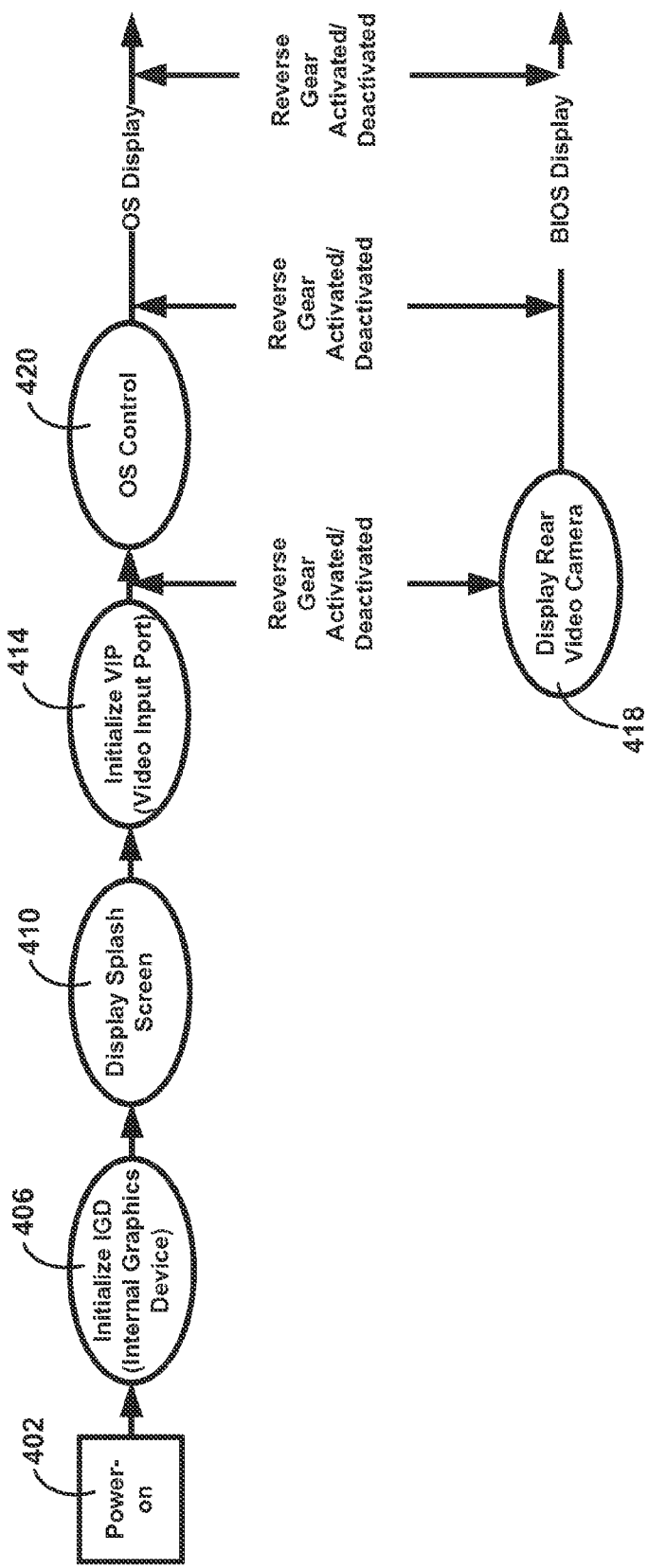
FIG. 4 schematically depicts a flowchart illustrating an execution process of the video display system in accordance with to certain embodiments of the present disclosure.

FIG. 4 is a flowchart illustrating an execution process of the video display system in accordance with certain embodiments of the present disclosure, where the graphic controller supports the camera's video format. At operation 402, the video display system 100 is powered on or rest. The BIOS program 121 initiates the basic hardware of the video display system 100, including the CPU core 112, the memory controller 115, the memory 120, the PCI express root complex 116, and the I/O hub 150. At operation 406, the BIOS program 121 initiates the graphic controller 114. At operation 410, the BIOS program 121 optionally can instruct the graphic controller 114 to output a predefined image, such as a company logo, for display on the display device 170. At operation 414, the BIOS program 121 initiates a video input port at the imaging processing module 152 of the I/O hub 150. The imaging processing module 152 now can receive video field data from the A/D converter 140 and generates video frame data. Then the I/O hub 150 can write the video frame data to the graphic frame buffer 126 (e.g., SPRITE Plane C) through the established PCI express channels. When the activation mechanism is triggered (e.g., the vehicle is in the reverse gear), the activation mechanism issues an SMI to the CPU 112. Accordingly, the SMM routine enables the access of the graphic controller 114 to the graphic frame buffer 126 (e.g. SPRITE Plane c). When the de-activation mechanism is triggered (e.g., the vehicle is in the drive gear), the de-activation mechanism issues an SMI to the CPU 112. Accordingly, the SMM routine disables the access of the graphic controller 114 to the graphic frame buffer 126. When the graphic controller 114 does not have access to the graphic frame buffer 126 and the OS is booted, at operation 420, the graphic controller 114 is under the control of the operating system and displays images as instructed by the operating system.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A vehicle display system, comprising:
 a video camera;
 a processor;
 a graphic controller;
 an image processing module receiving video signals from the video camera and generating first video data in a first format;
 a memory having a system management mode (SMM) program, wherein the SMM program is configured to, when executed at the processor, instruct the processor to
  read the first video data from a first area of the memory;
  convert the first video data to second video data in a second format; and
  write the second video data to a second area of the memory;
 a memory controller controlling the memory; and
 a PCI express switch configured to
  forward the first video data in the first format and received from the image processing module to the memory controller for storing in the first area of the memory; and
  forward the second video data in the second format and retrieved by the memory controller from the second area of the memory to the graphic controller.

2. The vehicle display system as claimed in claim 1, wherein the memory further has a Basic Input/Output System (BIOS) program configured to, when executed at the processor,
 initiate the graphic controller, the PCI express switch, the memory controller and the image processing module.

3. The vehicle display system as claimed in claim 2, wherein the BIOS program is further configured to, when executed at the processor,
 initiate PCI express communication channels among the graphic controller, the PCI express switch, the memory controller and the image processing module, such that the graphic controller, the memory controller and the image processing module are capable of communicating with each other through the PCI express switch.

4. The vehicle display system as claimed in claim 2, wherein the BIOS program is further configured to execute a system management interrupt (SMI) handler in a system management RAM (SMRAM) area in the memory, wherein the SMI handler is configured to load the SMM program into the SMRAM area.

5. The vehicle display system as claimed in claim 2, wherein the BIOS program is further configured to load the SMM program into a system management RAM (SMRAM) area in the memory.

6. The vehicle display system as claimed in claim 1, wherein the graphic controller is configured to process the second video data in the second format to generate video output signals based on the second video data.

7. The vehicle display system as claimed in claim 6, further comprising:
  a display device configured to display the video output signals; and
  a display driver configured to receive instructions from the graphic controller to generate the video output signals based on the second video data, and to send the video output signals to the display device.

8. The vehicle display system as claimed in claim 7, wherein the SMM program is further configured to determine whether the display device is activated or deactivated.

9. The vehicle display system as claimed in claim 8, further comprising a camera image display activation/deactivation mechanism, configured to
  in response to the display device being activated, enable access of the graphic controller to the second area of the memory; and
  in response to the display device being deactivated, disable the access of the graphic controller to the second area of the memory.

10. The vehicle display system as claimed in claim 1, wherein the first format is a YUV 4:2:2 format, and the second format is a BGRA or RGB 8:8:8 format.

11. A method of controlling a vehicle display system, comprising:
  receiving, at an image processing module, video signals captured by a video camera, and generating first video data in a first format based on the video signals;
  forwarding, by a PCI express switch, the first video data received at the image processing module to a memory controller, and storing the first video data in a first area of a memory;
  executing, at a processor, a system management mode (SMM) program;
  reading, at the processor executing the SMM program, the first video data from the first area of the memory;
  converting, at the processor executing the SMM program, the first video data to second video data in a second format;
  writing, at the processor executing the SMM program, the second video data in a second area of the memory;
  retrieving, by the memory controller, the second video data in the second format from the second area of the memory; and
  forwarding, by the PCI express switch, the second video data retrieved by the memory controller to a graphic controller.

12. The method as claimed in claim 11, further comprising:
  initiating, by a Basic Input/Output System (BIOS) program executed at the processor, the graphic controller, the PCI express switch, the memory controller and the image processing module; and
  initiating, by the BIOS program executed at the processor, PCI express communication channels among the graphic controller, the PCI express switch, the memory controller and the image processing module, such that the graphic controller, the memory controller and the image processing module are capable of communicating with each other through the PCI express switch.

13. The method as claimed in claim 12, wherein the BIOS program is configured to execute a system management interrupt (SMI) handler in a system management RAM (SMRAM) area in the memory, wherein the SMI handler is configured to load the SMM program into the SMRAM area.

14. The method as claimed in claim 12, wherein the BIOS program is configured to load the SMM program into a system management RAM (SMRAM) area in the memory.

15. The method as claimed in claim 11, further comprising:
  instructing, by the graphic controller, a display driver to process the second video data in the second format to generate video output signals based on the second video data; and
  displaying, at a display device, the video output signals.

16. The method as claimed in claim 15, further comprising:
  determining, by the SMM program, whether the display device is activated or deactivated;
  in response to the display device being activated, enabling, by a camera image display activation/deactivation mechanism, access of the graphic controller to the second area of the memory; and
  in response to the display device being deactivated, disabling, by the camera image display activation/deactivation mechanism, the access of the graphic controller to the second area of the memory.

17. The method as claimed in claim 11, wherein the first format is a YUV 4:2:2 format, and the second format is a BGRA or RGB 8:8:8 format.

18. A non-transitory computer readable medium storing computer executable codes, wherein the codes, when executed at a processor of a vehicle display system, are configured to
  instruct an image processing module to receive video signals captured by a video camera, and to generate first video data in a first format based on the video signals;
  instruct a PCI express switch to forward the first video data received at the image processing module to a memory controller, and store the first video data in a first area of a memory;
  execute a system management mode (SMM) program;
  read, at the processor executing the SMM program, the first video data from the first area of the memory;
  convert, at the processor executing the SMM program, the first video data to second video data in a second format;
  write, at the processor executing the SMM program, the second video data in a second area of the memory;
  instruct the memory controller to retrieve the second video data in the second format from the second area of the memory; and
  instruct the PCI express switch to forward the second video data retrieved by the memory controller to a graphic controller.

19. The non-transitory computer readable medium as claimed in claim 18, wherein the codes are further configured to
  execute a Basic Input/Output System (BIOS) program at the processor; and
  initiate, by the BIOS program executed at the processor, the graphic controller, the PCI express switch, the memory controller and the image processing module.

20. The non-transitory computer readable medium as claimed in claim 19, wherein the codes are further configured to initiate, by the BIOS program executed at the processor, PCI express communication channels among the graphic controller, the PCI express switch, the memory controller and the image processing module, such that the graphic controller, the memory controller and the image processing module are capable of communicating with each other through the PCI express switch.

21. The non-transitory computer readable medium as claimed in claim 19, wherein the codes are further configured to
execute, by the BIOS program executed at the processor, a system management interrupt (SMI) handler in a system management RAM (SMRAM) area in the memory; and
load, by the SMI handler, the SMM program into the SMRAM area.

22. The non-transitory computer readable medium as claimed in claim 19, wherein the codes are further configured to
load, by the BIOS program executed at the processor, the SMM program into a system management RAM (SMRAM) area in the memory.

23. The non-transitory computer readable medium as claimed in claim 18, wherein the codes are further configured to
control the graphic controller to instruct a display driver to process the second video data in the second format to generate video output signals based on the second video data; and
display, at a display device, the video output signals.

24. The non-transitory computer readable medium as claimed in claim 23, wherein the codes are further configured to
instruct the SMM program to determine whether the display device is activated or deactivated;
in response to the display device being activated, enable, by a camera image display activation/deactivation mechanism, access of the graphic controller to the second area of the memory; and
in response to the display device being deactivated, disable, by the camera image display activation/deactivation mechanism, the access of the graphic controller to the second area of the memory.

25. The non-transitory computer readable medium as claimed in claim 18, wherein the first format is a YUV 4:2:2 format, and the second format is a BGRA or RGB 8:8:8 format.

* * * * *